US008186333B2

(12) United States Patent  
Sakuyama (10) Patent No.: US 8,186,333 B2  
(45) Date of Patent: May 29, 2012

(54) VEHICLE HAVING INTERNAL COMBUSTION ENGINE WITH SUPERCHARGER

(75) Inventor: Hisashi Sakuyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 12/403,109

(22) Filed: Mar. 12, 2009

(65) Prior Publication Data  
US 2009/0229582 A1 Sep. 17, 2009

(30) Foreign Application Priority Data  
Mar. 17, 2008 (JP) ................................. 2008-067351

(51) Int. Cl.  
F02B 33/00 (2006.01)  
F02B 25/00 (2006.01)  
(52) U.S. Cl. .............. 123/559.1; 123/65 B; 123/65 BA; 123/65 P; 123/561  
(58) Field of Classification Search ................ 123/65 B, 123/65 BA, 65 P, 561, 559.1  
See application file for complete search history.

(56) References Cited

U.S. PATENT DOCUMENTS

| 4,691,288 A | * | 9/1987 | Kay et al. ......................... 702/41 |
| 5,477,838 A | * | 12/1995 | Schlunke et al. .......... 123/559.1 |
| 2005/0097888 A1 | * | 5/2005 | Miyashita ....................... 60/602 |
| 2008/0099263 A1 | * | 5/2008 | Takeshima et al. .......... 180/68.3 |

FOREIGN PATENT DOCUMENTS  
JP 2958718 B2 10/1999  
* cited by examiner

Primary Examiner — Quyen Leung  
Assistant Examiner — Jose Gonzalez Quinones  
(74) Attorney, Agent, or Firm — Birch, Stewart, Kolasch & Birch, LLP (57) ABSTRACT

A vehicle having an internal combustion engine with a supercharger is provided for reducing the number of parts and for reducing the size of the engine in the transverse direction of the vehicle by effectively utilizing an outer space around the engine. A supercharger is fixed to a rear end of a crank shaft, the crank shaft extends to the rear from a crank case, and is disposed on one side-face side of a cylinder head with an intake port formed therein. An air cleaner for the supply of air to the supercharger is disposed on an upstream side of the supercharger at a position above the supercharger and behind an engine E.

20 Claims, 7 Drawing Sheets

VEHICLE HAVING INTERNAL COMBUSTION ENGINE WITH SUPERCHARGER

CROSS-REFERENCE TO RELATED APPLICATIONS

The present application claims priority under 35 USC 119 to Japanese Patent Application No. 20008-067351 filed on Mar. 17, 2008 the entire contents of which are hereby incorporated by reference.

BACKGROUND OF THE INVENTION

1. Field of the Invention

The present invention relates to a vehicle having an internal combustion engine with a supercharger. More particularly, to a vehicle having an internal combustion engine with a supercharger, the supercharger being fixed to a crank shaft and disposed behind the engine to effectively utilize the space formed behind the engine.

2. Description of Background Art

Heretofore there has been known an internal combustion engine equipped with a supercharger as an engine auxiliary device for the supply of pressurized air to an intake pipe connected to an intake port of the engine. See, for example, Japanese Patent No. 2958718. In the internal combustion engine with a supercharger described in Japanese Patent No. 2958718, the supercharger is disposed below an intake manifold and a driving shaft of the supercharger and a crank shaft are connected with each other through a belt, allowing the power of the crank shaft to be transmitted to the supercharger through the belt.

In the internal combustion engine with a supercharger described in Japanese Patent No. 2958718, the supercharger is disposed below the intake manifold positioned sideways of the engine, whereby an intake passage which provides a connection between the supercharger and the intake port is made short to improve the leading-edge response characteristic of supercharging. However, since the power of the crank shaft is transmitted to the driving shaft of the supercharger through a belt, an additional drive mechanism such as the belt is needed.

SUMMARY AND OBJECTS OF THE INVENTION

It is an object of an embodiment of the invention to provide a vehicle having an internal combustion engine with a supercharger which can attain the reduction not only in the number of parts but also in size.

For achieving the above-mentioned object, according to of an embodiment of the present invention, there is provided a vehicle having an internal combustion engine with a supercharger. The vehicle includes an intake port disposed on one side-face side of a cylinder head of the engine and into which a fuel mixture is supplied, a crank shaft supported rotatably within a crank case of the engine, and the supercharger adapted to pressurize air to be supplied to the engine and to supply the pressurized air to the intake port. The crank shaft extends from the crank case in a direction substantially orthogonal to the one side-face, and the supercharger is disposed on the one side-face side with the intake port disposed thereon and is fixed to the crank shaft extending from the crank case.

According to an embodiment of the present invention, the vehicle is a saddle-ride type vehicle and that the crank shaft extends in a longitudinal direction of the saddle-ride type vehicle.

According to an embodiment of the present invention, the intake port has an opening which opens to a rear surface of the cylinder head with an air cleaner positioned above and upstream of the supercharger and behind the engine to supply air introduced from the exterior to the supercharger.

According to an embodiment of the present invention, since the supercharger is disposed on one side-face side of the engine with the intake port disposed thereon and is fixed to the crank shaft which extends from the crank case in a direction substantially orthogonal to the one side-face, it becomes unnecessary to use a power transfer part such as a belt, whereby it becomes possible to reduce the number of parts and reduce the size of the engine.

According to an embodiment of the present invention, since the crank shaft of the engine mounted on the saddle-ride type vehicle is disposed so as to extend in the longitudinal direction of the saddle-ride type vehicle, it is possible to narrow the size in the transverse direction of the engine. Thus, it is possible to reduce the engine size.

According to an embodiment of the present invention, since the intake port has an opening formed in the rear surface of the cylinder head and the air cleaner disposed upstream of the supercharger is positioned above and behind the engine, it is possible to effectively utilize the space present behind the engine and hence possible to reduce the engine size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
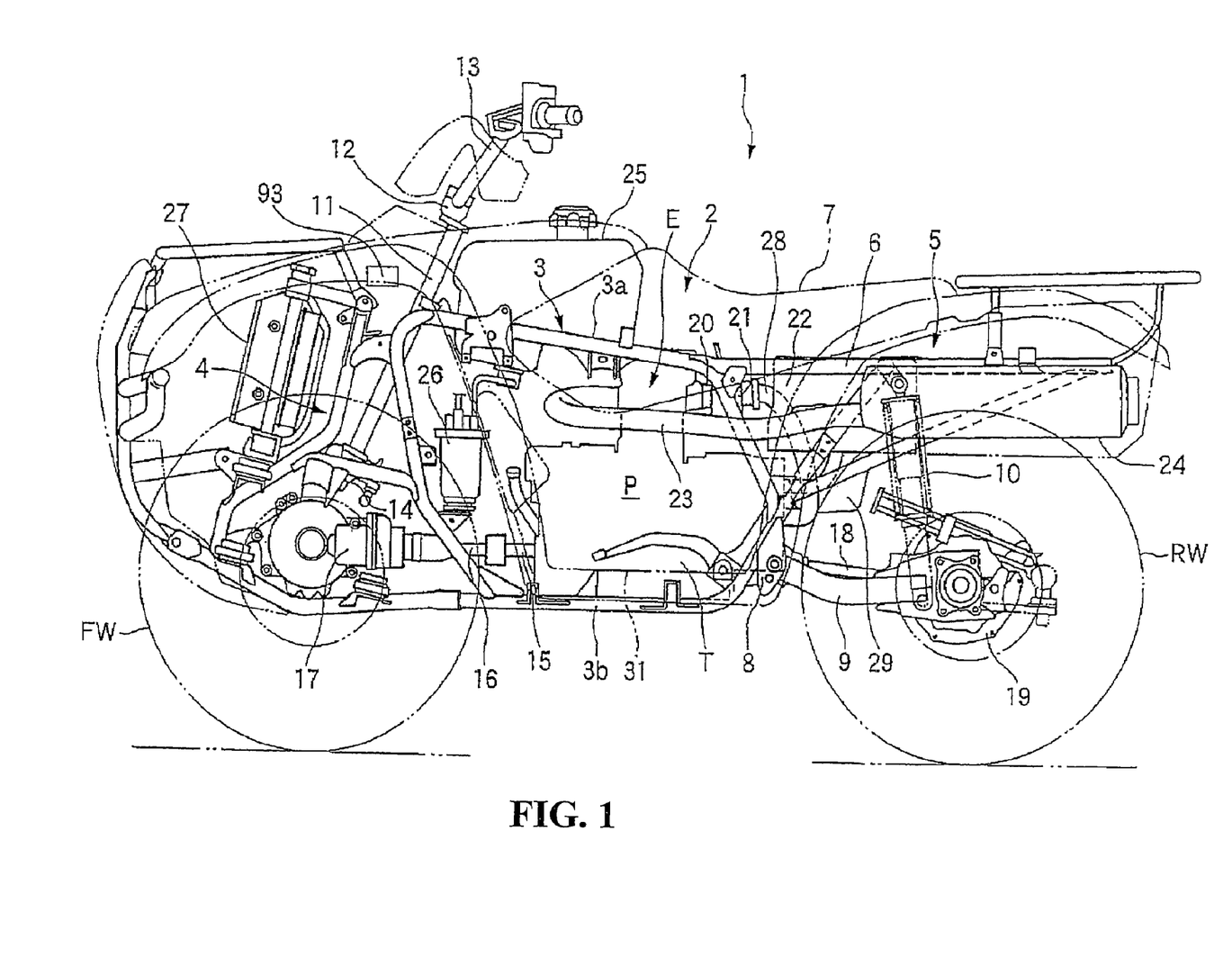
FIG. 1 is a side view of a vehicle having an internal combustion engine with a supercharger according to the present invention, with a body cover, etc. removed.
Figure 2:
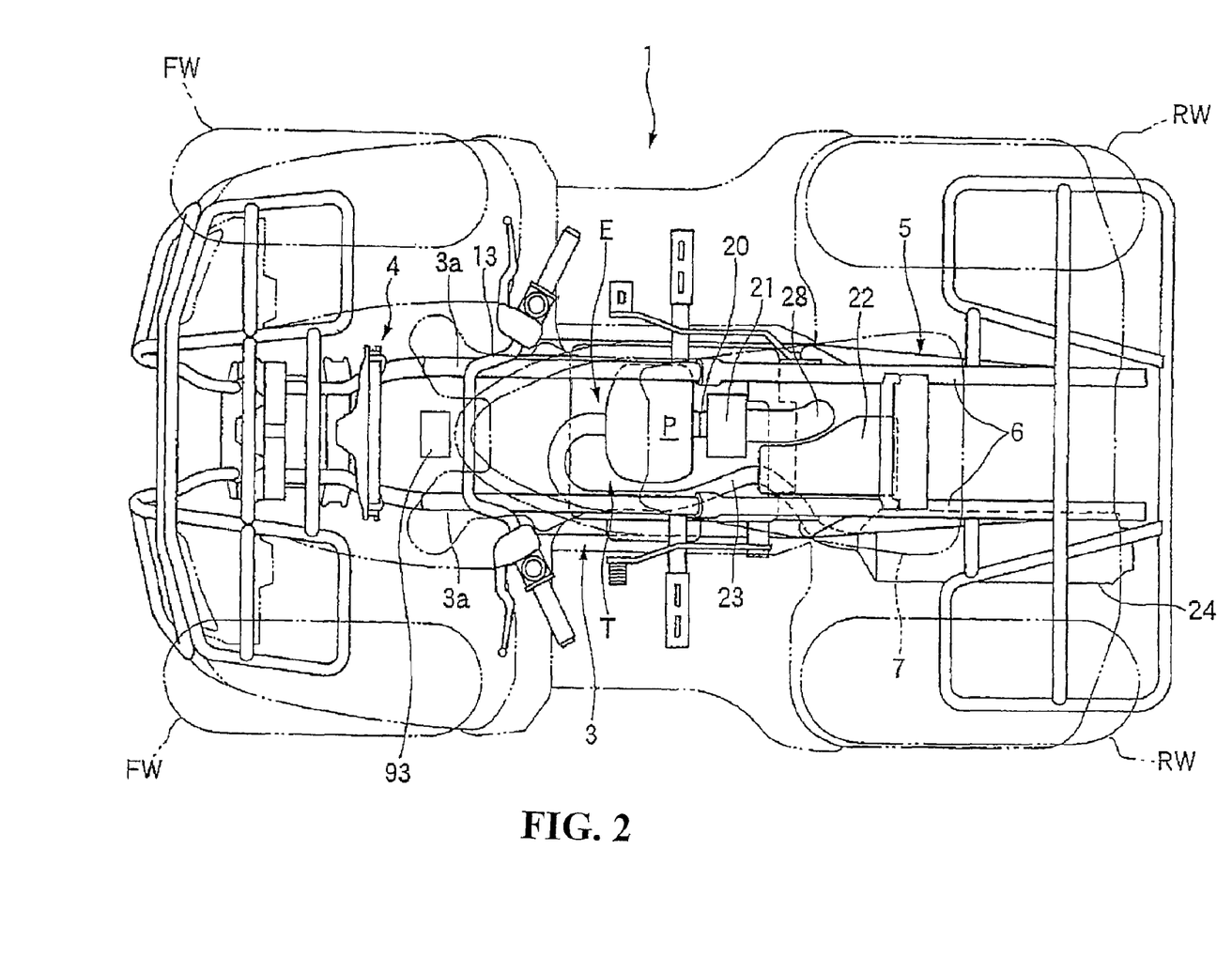
FIG. 2 is a plan view thereof.

A vehicle having an internal combustion engine with a supercharger according to an embodiment of the present invention will be described below in detail with reference to the drawings. FIG. 1 is a side view of a saddle-ride type vehicle 1 with a water-cooled engine E mounted thereon in accordance with an embodiment of the present invention and FIG. 2 is a plan view thereof. In this embodiment, front, rear, right, and left sides are determined on the basis of a state in which the vehicle faces in an advancing direction.

As shown in FIGS. 1 and 2, the saddle-ride type vehicle 1 of this embodiment is a four-wheeled all-terrain vehicle, in which a pair of right and left front wheels FW and a pair of right and left rear wheels RW with low pressure balloon tires for an all-terrain vehicle are suspended at front and rear positions of a body frame 2.

The body frame 2 is constituted by connecting of a variety of steels and it is made up of a center frame portion 3 with a power unit P mounted thereon, the power unit P including an engine E and a transmission T both integrally constituted within a crank case 31, a front frame portion 4 connected to a front side of the center frame 3 and suspending the front wheels FW, and a rear frame portion 5 connected to a rear side of the center frame portion 3 and having seat rails 6 for supporting a seat 7.

The center frame portion 3 includes a pair of right and left upper pipes 3a which are each bent downwards at front and rear positions to provide substantially three sides, with a pair of right and left lower pipes 3b as other substantial one sides being connected to the upper pipes 3a to provide an approximately rectangular shape in side view, both right and left pipes being connected together by a cross member.

A pivot plate 8 is fixed to an obliquely upwardly bent rear portion of each lower pipe 3b and a swing arm 9 is connected at a front end thereof to the pivot plate 8 pivotably. A shock absorber 10 is interposed between a rear portion of the swing arm 9 and the rear frame portion 5. Further, a rear final reduction gear unit 19 is provided at a rear end of the swing arm 9 and the associated rear wheel RW is suspended by the rear final reduction gear unit 19.

A steering column 11 is supported centrally in the transverse direction of a cross member which is mounted bridgewise between front end portions of the right and left upper pipes 3a. A steering shaft 12 is supported steerably by the steering column 11 and a steering handle 13 is connected to an upper end portion of the steering shaft 12. A lower end portion of the steering shaft 12 is connected to a front wheel steering mechanism 14.

Figure 3:
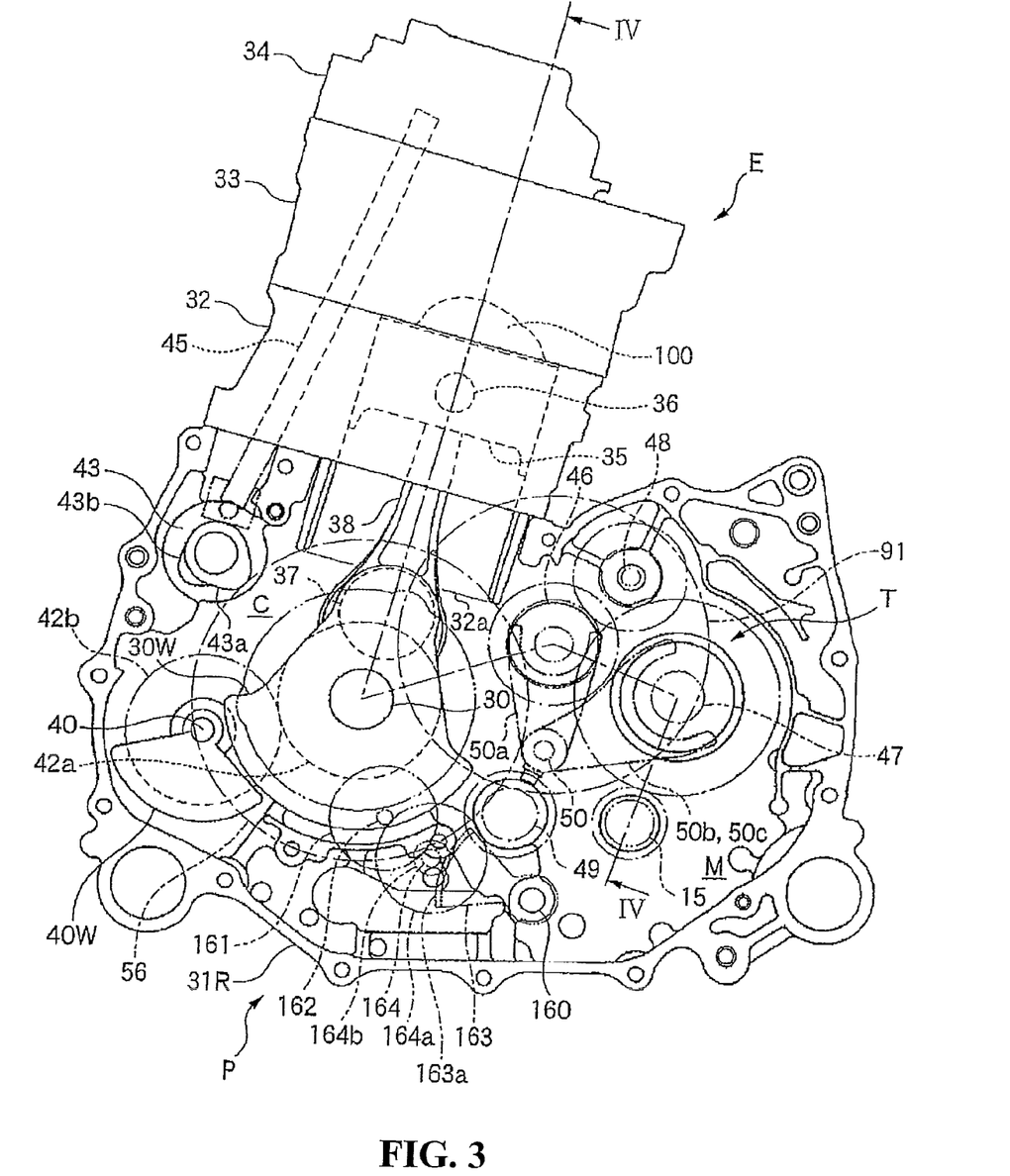
FIG. 3 is a front view of a power unit with a front crank case half of the engine omitted.

Referring also to FIG. 3 which is a sectional view of the power unit P, the engine E of the power unit P is a water-cooled, single-cylinder, four-stroke engine and is mounted on the center frame portion 3 in a so-called longitudinal attitude in which a crank shaft 30 faces in the longitudinal direction of the vehicle body.

The transmission T of the power unit P is disposed within a transmission case M located on the right side of a crank case C which supports the crank shaft 30 of the engine E. A longitudinally extending output shaft 15 projects to the front and rear from the transmission T. Rotating power of the output shaft 15 is transmitted from a front end of the output shaft 15 to the right and left front wheels FW via a front drive shaft 16 and a front final reduction gear unit 17 and it is also transmitted from a rear end of the output shaft 15 to the right and left rear wheels RW via a rear drive shaft 18 and the rear final reduction gear unit 19.

The engine E is constituted by the crank case 31, as well as a cylinder block 32, a cylinder head 33, and a cylinder head cover 34 which are stacked in this order on the crank case 31. The cylinder block 32 is erected in a leftwards inclined state with respect to the vertical direction. An intake pipe 20 extending to the rear from the cylinder head 33 is connected to a discharge port of a scroll type supercharger 120 via a throttle body 21 and an intake connection pipe 28. With an air cleaner connection pipe 29, an intake port of the scroll type supercharger 120 is connected to an air cleaner 22 which is disposed above the scroll type supercharger 120 and behind the cylinder head 33. An exhaust pipe 23 extends forward from the cylinder head 33, then bends to the left side, extends to the rear, further extends to the rear along the left side of the air cleaner 22 and is connected to an exhaust muffler 24.

A fuel tank 25 is supported by the center frame position 3 of the body frame 2 at a position above the power unit P and a fuel pump 26 is disposed below a front portion of the fuel tank 25. Further, a radiator 27 is supported by the front frame portion 4 of the body frame 2.

Next, the construction of the power unit P will be described below with reference to FIGS. 3 and 4. FIG. 3 is a front view with a front crank case 31F, etc. of the power unit omitted and FIG. 4 is a sectional view of a power transmission mechanism in the internal combustion engine taken on line IV-IV in FIG. 3.

Figure 4:
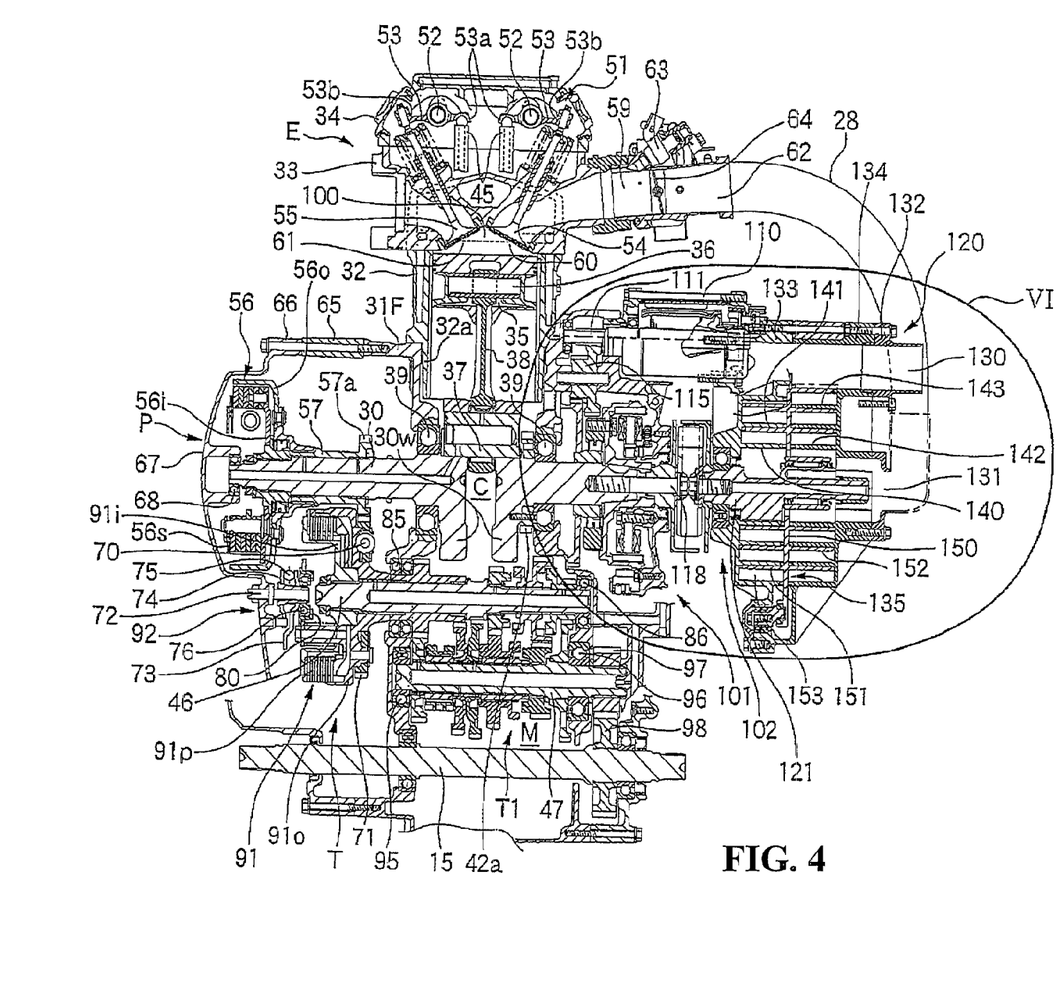
FIG. 4 is a sectional view taken on line IV-IV of the power unit shown in FIG. 3.

As shown in FIG. 4, the crank case 31 which constitutes the crank case C and the transmission case M in the power unit P includes a front crank case 31F and a rear crank case 31R which are divided to the front and the rear from a plane orthogonal to the crank shaft 30 which extends in the longitudinal direction of the vehicle body while passing through the axis of a cylinder bore of the cylinder block 32. A front mating surface of the rear crank case 31R and a rear mating surface of the front crank case 31F are superimposed and clamped together. Further, as shown in FIG. 3, the crank case 31 houses therein crank webs 30w of the crank shaft 30, a balancer weight 40w of a balancer shaft 40, cam lobes 43a and 43b of a cam shaft 43, and a transmission gear train group T1.

As shown in FIGS. 3 and 4, a cylinder sleeve 32a is fitted into the crank case 31 from the cylinder block 32 and a piston 35 is slidably fitted in the cylinder sleeve 32a. A crank pin 37 disposed bridgewise between a pair of front and rear crank webs 30w of the crank shaft 30 and a piston pin 36 provided in the piston 35 are connected with each other through a connecting rod 38. The crank shaft 30 is supported through a pair of main bearings 39 which are respectively provided in the front crank case 31F and the rear crank case 31R at front and rear positions with respect to the crank webs 30w.

Referring to FIG. 3, the balancer shaft 40 is disposed in parallel with the crank shaft 30 at a right lower position (a left lower position in FIG. 3) with respect to the crank shaft 30. The balancer shaft 40 is supported at both ends thereof by bearings (not shown) provided in the front and rear crank cases 31F, 31R, respectively. The balancer weight 40w is formed centrally of the balancer shaft 40 and a driven gear 42b is fitted on a rear portion of the balancer shaft 40, the driven gear 42b being in mesh with a driving gear 42a fitted on the crank shaft 30.

The cam shaft 43 as a component of a valve operating system is disposed at an obliquely upward position on the right side of the crank shaft 30 and in parallel with the crank shaft 30. Both ends of the cam shaft 43 are supported by bearings (not shown) disposed in the front and rear crank cases 31F, 31R, respectively. Rotation of the crank shaft 30 is transmitted to the cam shaft via a reduction mechanism (not shown) with a reduction ratio of 1/2. Lower ends of push rods 45 are in abutment against the cam lobes 43a and 43b of the cam shaft 43, the push rods 45 functioning to transmit a driving force to valve operating mechanisms 51 which open and close an intake valve 54 and an exhaust valve 55.

In the valve operating mechanisms 51, rocker arm shafts 52 are supported at both ends thereof by the cylinder head cover 34 and rocker arms 53 are rockably fitted respectively on the rocker arm shafts 52. Upper ends of the push rods 45 are put in abutment against one ends 53a of the rocker arms 53. Other ends 53b of the rocker arms 53 are abutted respectively against upper ends of the intake valve 54 and the exhaust valve 55 both disposed in the cylinder head 33 and push the valve upper ends. According to this construction, when the crank shaft 30 makes two turns, the cam shaft 43 makes one turn, and the rocker arms 53 rock about the rocker arm shafts 52 in accordance with lifters set to the cam lobes 43*a* and 43*b*, pushing the intake valve 54 and the exhaust valve 55 at a predetermined timing to control opening and closing of an intake port 60 and an exhaust port 61.

The intake port 60 is disposed in one side face (rearface) orthogonal to the crank shaft 30 of the cylinder head 33 and has an opening 59 which opens to the rear. The exhaust port 61 is disposed in another side face (front face) orthogonal to the crank shaft 30.

An intake pipe 62 communicating with the opening 59 of the intake port 60 is connected to the cylinder head 33. At a side face of the intake pipe 62 is disposed a fuel injection device 63 which injects fuel into the intake pipe 62 at a predetermined timing. A butterfly valve 64 is disposed within the intake pipe 62 on an upstream side with respect to the fuel injection valve 63. The amount of air to be supplied into the intake port 60 is controlled by opening or closing the butterfly valve 64. The intake pipe 62 is connected to the discharge port of the scroll type supercharger 120 through the intake connection pipe 28. The outside air introduced through the air cleaner 22 is pressurized by the scroll type supercharger 120 and is then supplied to the intake pipe 62.

An ignition device (not shown) is disposed in a combustion chamber 1000 formed between a crown of the piston 35 and a ceiling surface of the cylinder head 33 to ignite fuel (fuel mixture) which contains air fed from the intake pipe 62. The timing of the fuel injection made by the fuel injection device 63 and that of the ignition made by the ignition device are controlled by an ECU 93 (see FIGS. 1 and 2) which is a control unit including a microcomputer.

The transmission T is disposed on the left side (the right side in FIG. 3) of the crank shaft 30. A main shaft 46, a counter shaft 47 and an intermediate shaft 48 constitute a transmission gear mechanism. Shift is made by operation of a shift drum 49 and is transmitted to the output shaft 15.

Referring to FIG. 4, a centrifugal type starting clutch 56 includes a clutch inner 56*i* as an input member adapted to rotate integrally with the crank shaft 30, a bowl-like clutch outer 56*o* as an output member which encloses the clutch inner 56*i* radially outwards, and a clutch shoe 56*s* supported pivotally by the clutch inner 56*i* and adapted to pivot radially outwards into contact and connection with the clutch outer 56*o* by virtue of a centrifugal force. A boss portion of the clutch outer 56*o* is splined to a cylindrical gear member 57 which is supported rotatably on the crank shaft 30. Power is transmitted from a driving gear 57*a* of the cylindrical gear member 57 to the transmission T.

The main shaft 46 of the transmission T is disposed at an obliquely upward position on the left side of the crank shaft 30 and in parallel with the crank shaft 30 and is supported by the front and rear crank cases 31F, 31R rotatably through bearings 85 and 86. A shift clutch 91 is mounted on a front end portion of the main shaft 46 which extends forward from the bearing 85 held in the front crank case 31F.

In the shift clutch 91, which is a multiple disc friction clutch, a clutch inner 91*i* is fixed to the front end of the main shaft 46, a clutch outer 91*o* is supported rotatably by the main shaft 46, a pressure plate 91*p* is interposed between the clutch inner 91*i* and the clutch outer 91*o*, and a stack of a plurality of clutch discs adapted to rotate integrally with the clutch outer 91*o* and plural friction discs adapted to rotate integrally with the clutch inner 91*i* is pushed or released by the pressure plate 91*p* to make a power transfer control.

A primary driven gear 71 is mounted on the clutch outer 91*o* through a damper spring 70. The primary driven gear 71 and the driving gear 57*a* of the cylindrical gear member 57 are in mesh with each other. Therefore, when the starting clutch 56 engages and the rotation of the crank shaft 30 is transmitted to the driving gear 57*a*, rotating power is transmitted to the clutch outer 91*o* of the shift clutch 91 through the primary driven gear 71 and the damper spring 70, and when the shift clutch 91 engages, the main shaft 46 rotates together with the clutch inner 91*i*.

A front case cover 66 is applied to the front side of the front crank case 31F through a spacer 65. The spacer 65 is an extension member formed as a forward extension of a peripheral edge portion of a front face of the front crank case 31F. An oil pump unit (not shown) in a dry sump lubrication system, as well as a part of an oil tank (not shown), are formed in the spacer 65. A bearing 68 for supporting a front end of the crank shaft 30 is disposed in a front wall 67 of the front case cover 66.

Clutch operating means 92 for operating the pressure plate 91*p* is disposed on the front side of the main shaft 46. In the clutch operating means 92, a movable cam plate lever 73 is supported on a pivot shaft 72 pivotably and axially slidably, the pivot shaft 72 being fixed to the front wall 67 of the front case cover 66 coaxially with the main shaft 46. A stationary plate 74 is fixed to the pivot shaft 72 in opposition to the front side of the movable cam plate lever 73 and a ball 75 is interposed between the stationary plate 74 and the movable cam plate lever 73. The movable cam plate lever 73, upon pivotal motion thereof, moves backward (rightwards in FIG. 4) with reaction force which it undergoes from the stationary plate 74 through the ball 75.

A connection plate 80 is connected to the movable cam plate lever 73 through a bearing 76 and is also connected to the pressure plate 91*p* of the shift clutch 91. With the backward movement of the movable cam plate lever 73, the pressure plate 91*p* destacks the friction discs and disengages the shift clutch 91.

A shift spindle 160, to be described later, operates the movable cam plate lever 73. A roller (not shown) is mounted at a front end of a clutch arm (not shown) fixed to the shift spindle 160 and it is engaged with a groove formed in a front end of the movable cam plate lever 73. When the shift spindle 160 rotates and the clutch arm swings, the movable cam plate lever 73 pivots and disengages the shift clutch 91.

Between the portion of the main shaft 46 extending into the transmission case M and the counter shaft (and the intermediate shaft 48) extending in parallel with the main shaft extending portion and supported by bearings 95 and 96, there is constituted the transmission gear train group T1 as a collection of gear trains for setting a shift range.

A driving gear 97 is fitted on a rear end of the counter shaft 47 with a rear end that extends to the rear from the rear crank case 31R, while a driven gear 98 is fitted on the output shaft 15 disposed in parallel with the counter shaft 47. The driven gear 98 is in mesh with the driving gear 97 to transmit decelerated power to the output shaft 15.

As shown in FIG. 3, the shift drum 49 is mounted bridgewise on the front and rear crank cases 31F, 31R and shift pins of shift forks 50*a*, 50*b*, and 50*c* supported slidably on a guide shaft 50 are fitted in three shift grooves formed in the outer periphery surface of the shift drum 49. As the shift drum 49 turns, the shift fork 50*a* moves axially while being guided by the associated shift groove and it causes a shifter on the main shaft 46 to move, while the shift forks 50*b* and 50*c* causes a shifter on the counter shaft 47 to move axially, thereby changing the set of engaging shift gears.

A shift spindle 160 as a shifting rotary axis is disposed adjacently on a left lower position (a right lower position in FIG. 3) of the shift drum 49, and shift transfer means (not shown) is disposed between the shift spindle 160 and the shift drum 49, whereby the rotation of the shift spindle 160 is transmitted to the shift drum 49 through the shift transfer means to turn the shift drum 49 at a required angle. A fan-shaped gear shift arm 163 is fitted on the shift spindle 160. A fan-shaped base portion of the gear shift arm 163 is fitted on the shift spindle 160 and a large-diameter gear 163a is formed on an arcuate outer periphery portion of the gear shift arm 163. A turning angle of the shift drum 49 is detected by a shift position detector 170 which is disposed coaxially behind the shift drum 49 (see FIG. 5).

A shifting electric motor 161 is attached from the front side to the front wall 67 of the front case cover 66. A driving gear of a small diameter (not shown) is formed on a motor drive shaft 162 of the shifting electric motor 161.

An idle gear shaft 164 is supported rotatably at an approximately intermediate position between the motor drive shaft 162 of the shifting electric motor 161 and the shift spindle 160. A large-diameter gear 164a and a small-diameter gear 164b are integrally formed on the idle gear shaft 164. The large-diameter gear 164a of the idle gear 164 is in mesh with the driving gear of the motor drive shaft 162, while the small-diameter gear 164b of the idle gear shaft 164 is in mesh with the large-diameter gear 163a of the gear shift arm 163 on the shift spindle 160.

When the shifting electric motor 161 is turned ON and the motor drive shaft 162 rotates, rotating power is transmitted to the shift spindle 160 via the idle gear shaft 164. As noted above, the rotation of the shift spindle 160 disengages the shift clutch 91 via the clutch arm and the clutch operating means 92 and at the same time causes the shift drum 49 to turn at a required angle via the shift transfer means, thereby causing the shift forks 50a, 50b and 50c to slide. Consequently, the set of meshing gears in the shift gear train group T1 is changed to carry out a shift of the transmission T.

Figure 5:
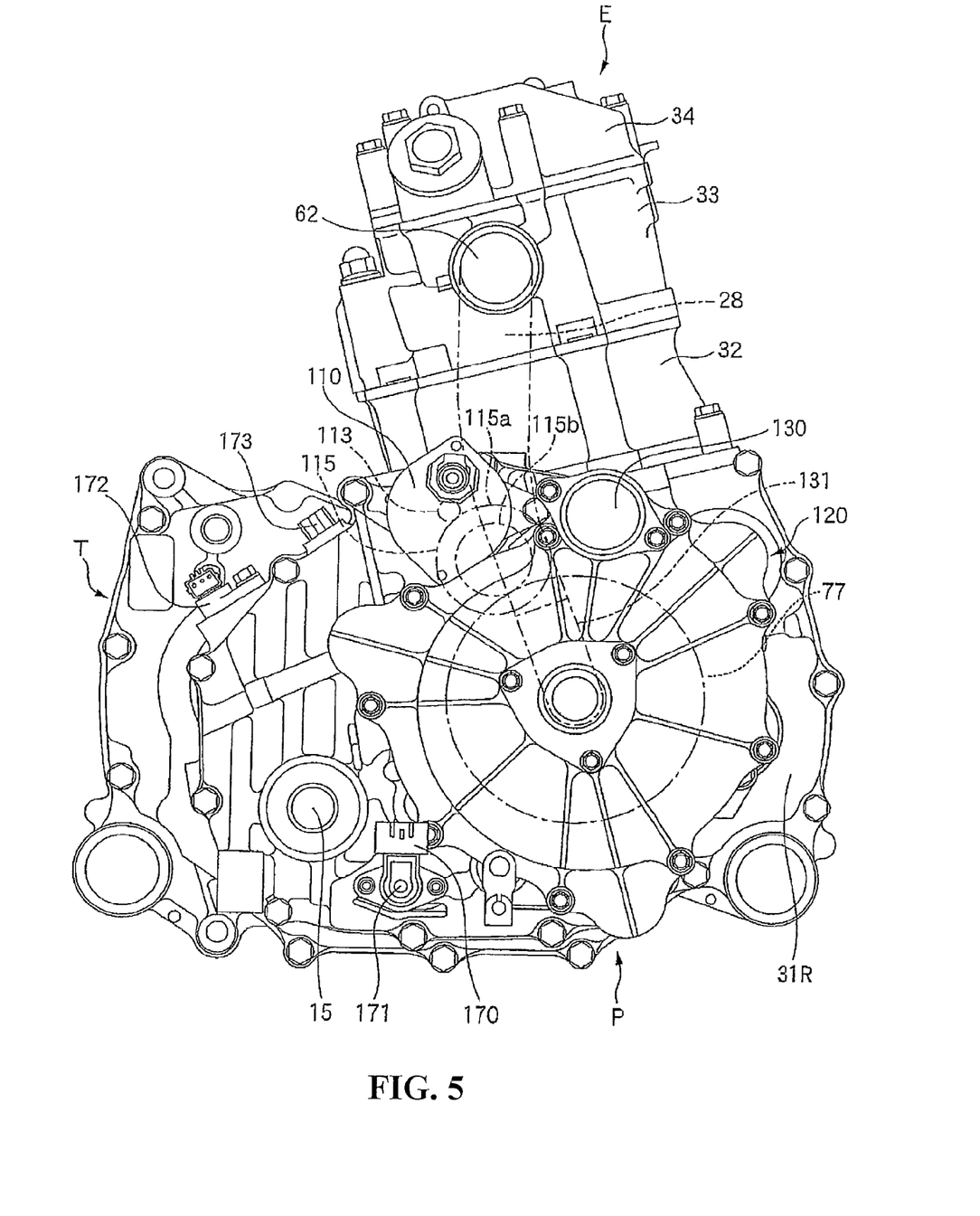
FIG. 5 is a rearview of the power unit.

In the rear portion of the power unit P, as shown in FIG. 5 which is a rear view of the power unit P, there are disposed auxiliary devices of the engine such as the shift position detector 170 disposed at a rear end of a rotary shaft of the shift drum 49 to detect a turning angle of the shift drum 49, a rotational angle sensor 171 attached to a rear end of the shift spindle 160, a vehicle speed sensor 172 attached to the rear end of the counter shaft 47, and a sensor terminal 173 of the shift position detector 170 which terminal is mounted on the right side of the vehicle speed sensor 172. A generator 101 and a starter motor 110 are also disposed in the rear portion of the power unit P (see FIG. 4).

At a rear end of the crank shaft 30 extending to the rear from the rear crank case 31R, there are mounted the generator 101, a rotary joint 102 connected to the scroll type supercharger 120, and a starting driven gear 77 which transmits the rotation of a starter motor 110 mounted to the rear crank case 31R to the crank shaft 30. The driven gear 77 is coupled to a flywheel 103 of the generator 101 via a one-way clutch 78.

Figure 6:
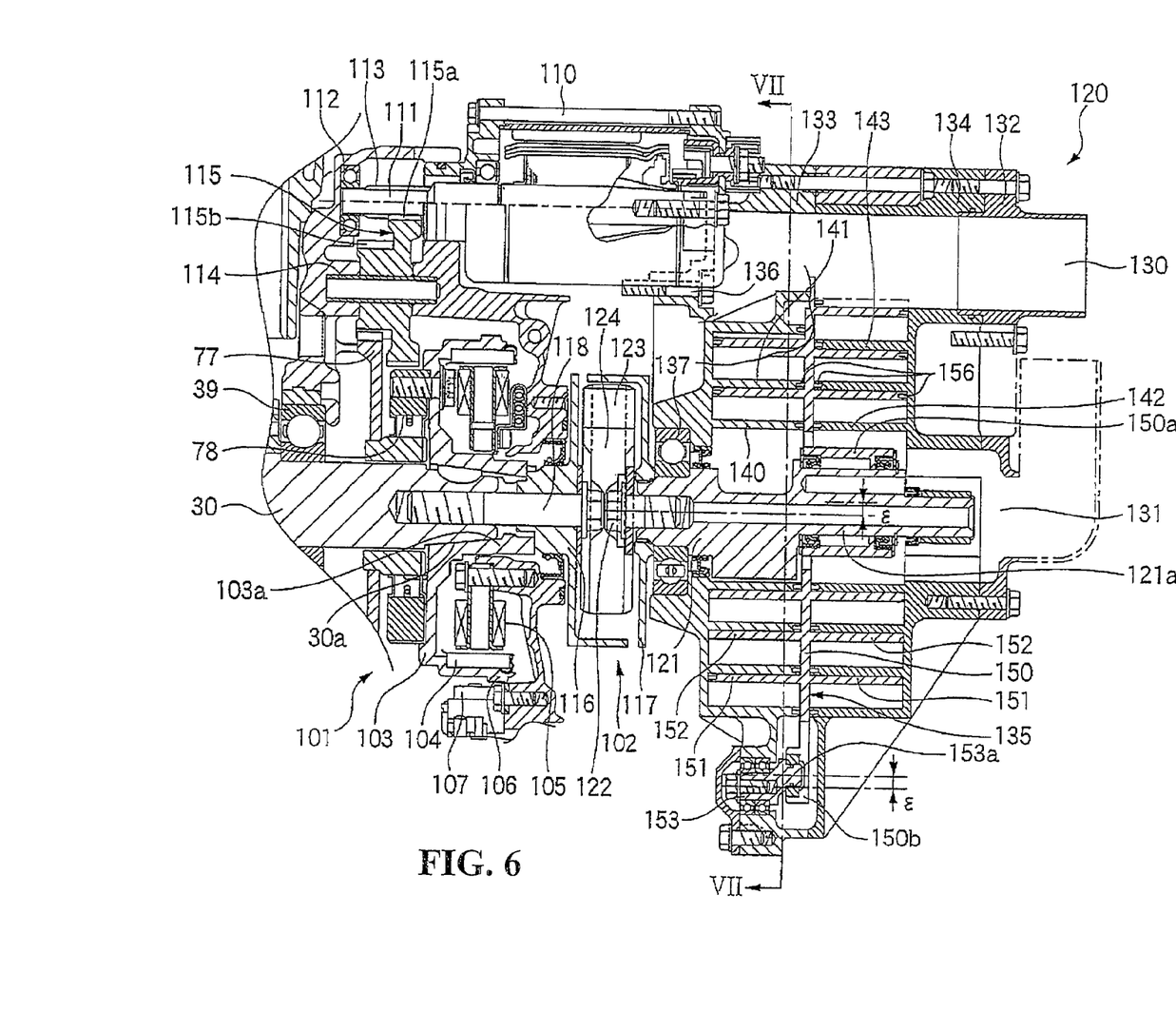
FIG. 6 is an enlarged sectional view of a portion VI shown in FIG. 4.
Figure 7:
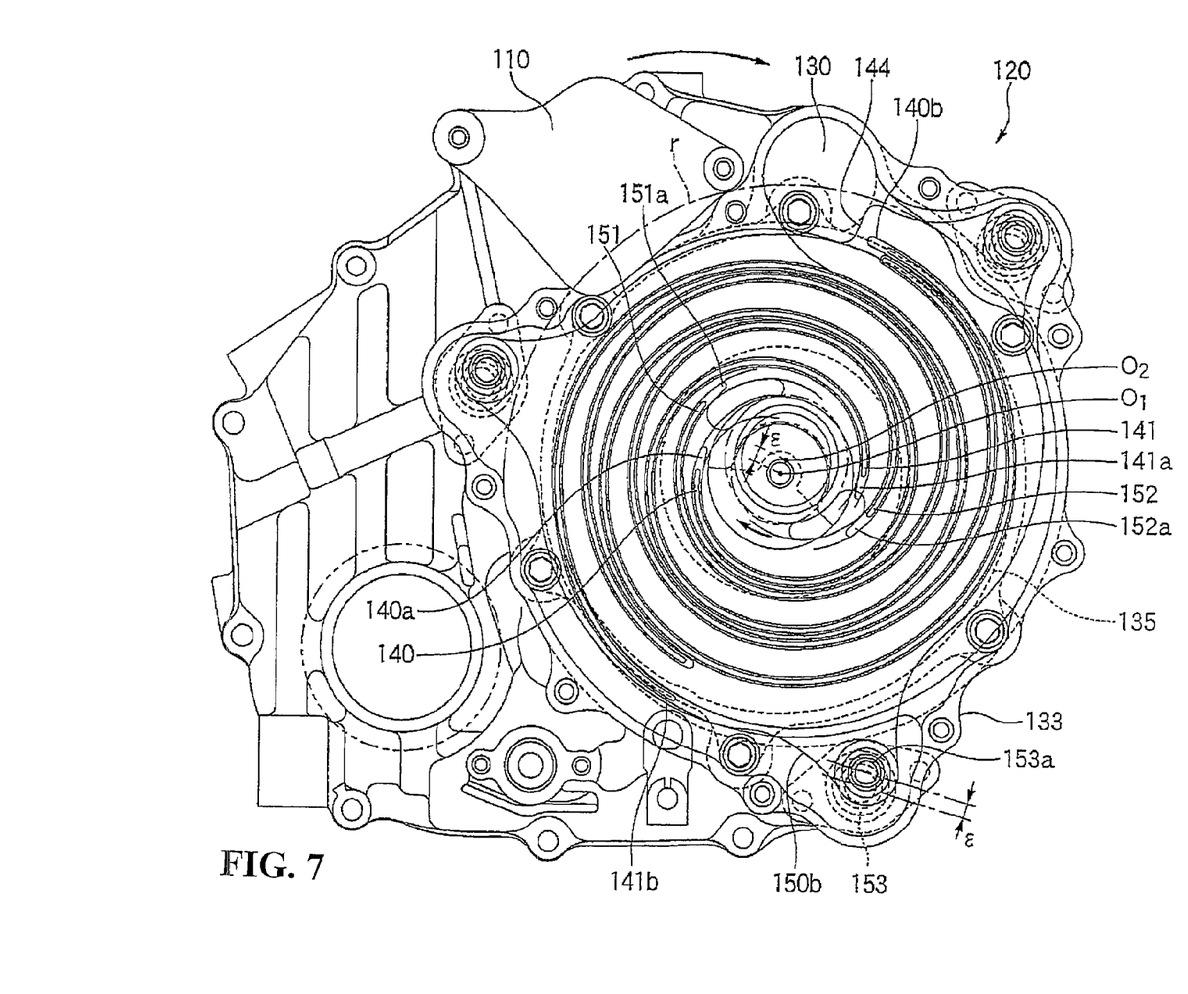
FIG. 7 is a sectional view taken on line VII-VII in FIG. 6.

As shown in FIG. 6, the starter motor 110 as an auxiliary device of the engine is disposed adjacent to an outer terminal end 140b of a stationary scroll portion 140 of the scroll type supercharger 120 as will be described later and is fixed to the rear crank case 31R. Moreover, as shown in FIG. 7, the starter motor 110 is disposed so that at least a part thereof is positioned inside a maximum radius r of the scroll type supercharger 120. A rotary shaft 111 of the starter motor 110 is supported at a front end thereof by a ball bearing 112 which is provided in the rear crank case 31R. A driving gear 113 formed on the rotary shaft 111 is in mesh with a large-diameter gear 115a of an intermediate gear 115 which is in mesh with a support shaft 114 pivotably, and a small-diameter gear 115b of the intermediate gear 115 is in mesh with the starting driven gear 77. With this construction, the rotation of the rotary shaft 111 of the starter motor 110 is transmitted to the crank shaft 30 via the intermediate gear 115 and the starting driven gear 77 to start the engine E.

A boss portion 103a of the bowl-like flywheel 103 is fitted and fixed onto a tapered portion 30a formed at the rear end of the crank shaft 30 and is adapted to rotate integrally with the crank shaft 30. Plural ferrite magnets 104 are fixed to a bowl-like inner periphery surface of the flywheel 103 at predetermined intervals in the circumferential direction. Coils 105 fixed to the rear crank case 31R are disposed radially inside the ferrite magnets 104 so as to confront the ferrite magnets 104. The generator 101 is constituted by the ferrite magnets 104 and the coils 105. That is, a magnetic force of the ferrite magnets 104 passes across the coils 105 with rotation of the crank shaft 30, whereby electromotive force is generated in the coils 105.

A plurality of protuberances 106 are formed on the outer periphery surface of the flywheel 103 in a predetermined angle range and at predetermined intervals (e.g., 30° intervals) in the circumferential direction. A pulse sensor 107 is disposed circumferentially outside a rotational path of the protuberances 106. The pulse sensor 107 detects the protuberance 106 every time the protuberances pass near the sensor and sends a detection signal to the ECU 93 as a controller. On the basis of the detection signal the ECU 93 detects the phase of the crank shaft 30 and controls the fuel injection timing in the fuel injection device 63 and the ignition timing in the ignition device.

At a rear end of the crank shaft 30 extending to the rear from the rear crank case 31R, the flywheel 103 and the front boss 116 of the rotary joint 102 are commonly clamped by a bolt 118 screwed with the crank shaft 30. Thus, the flywheel 103 and the front boss 116 of the rotary joint 102 are integrally fixed to the crank shaft 30.

A rear boss 117 of the rotary joint 102 is fixed with a bolt 122 to a crank shaft 121 of the scroll type supercharger 120. The front boss 116 and the rear boss 117 of the rotary joint 102 are coupled together by rotation transfer members 123 and 124 which can effect the transfer of rotational force by mutual engagement. The rotation transfer members 123 and 124 are formed of a material having elasticity, e.g., rubber and exhibits a cushioning property. They absorb a rotational fluctuation of the crank shaft 30 and transmit the rotation of the crank shaft to the crank shaft 121 of the scroll type supercharger 120.

As shown in FIGS. 6 and 7, the scroll type supercharger 120 includes a first casing 132, the first casing 132 being formed with an intake port 130 to which the air cleaner connection pipe 29 is connected and a discharge port 131 to which the intake connection pipe 28 is connected, a second casing 133 and a third casing 134 both formed in a bottomed cylindrical shape and functioning as stationary scrolls, the second and third casings 133, 134 being respectively formed inside with stationary scroll portions 140, 141 and 142, 143, and a movable scroll 135.

The first, second, and third casings 132, 133, and 134 are integrally assembled with bolts in a state in which the movable scroll 135 is mounted between the second and third casings 133, 134. The scroll type supercharger 120 is fixed with a plurality of bolts to the rear portion of the engine E, more specifically, sideways of and in adjacency to the output shaft 15 of the rear crank case 31R (see FIG. 5), and extends in a predetermined direction from the rear crank case 31R.

The air having been introduced from the exterior and cleaned by the air cleaner 22 is supplied to the scroll type supercharger 120 through the air cleaner connection pipe 29 and is pressurized by the supercharger. The resulting compressed air is supplied to the intake port 60 of the engine E through the intake connection pipe 28 and the throttle body 21.

The crank shaft 121 of the scroll type supercharger 120 is disposed approximately through the center of the first, second, and third casings 132, 133, and 134 and a front end side thereof is supported rotatably by a rolling bearing 137 disposed in the second casing 133. The second and third casings 133, 134 functioning as stationary scrolls have inside thereof thin plate-like stationary scroll portions 140, 141 and 142, 143, respectively, which are formed so as to extend in the longitudinal direction of the vehicle 1. The stationary scroll portions 140, 141 and 142, 143 are disposed equal in phase and in opposition to each other.

The stationary scroll portions 140, 141 and 142, 143 are constituted by a pair of involute curves with a central point O1 of the discharge port 131 as an origin and intersecting points between the involute curves and an outer diametrical line of the discharge port are made starting points 140a, 141a (142a, 143a). The intake port 130 formed in the first casing 132 extends in parallel with a stationary scroll on an extension line of an outer terminal end 140b of the stationary scroll portion 140 and are adjacent to the outer terminal end 140b. More specifically, the intake port 130 is disposed near a circumferential extension line of the outer terminal end 140b of the stationary scroll portion 140 and adjacent to a stepped outer periphery end 144 of the stationary scroll constituted by the second casing 133.

In the movable scroll 135, thin plate-like movable scroll portions 151 and 152, which are formed by a pair of involute curves with a central point O2 as an origin, are formed on both surfaces of a movable base plate 150 so as to extend in the longitudinal direction of the vehicle 1. Starting points 151a and 152a of the movable scroll portions 151 and 152 are set at 90° clockwise or semiclockwise rotated positions of the starting points 140a and 141a of the stationary scroll portions 140 and 141.

An eccentric shaft 121a having an eccentric quantity $\epsilon$ relative to the axis of the crank shaft 121 is fitted in a central hole of a boss 150a formed on the movable base plate 150. The movable base plate 150 is formed with a second crank shaft support portion 150b and an eccentric shaft 153a of a second crank shaft 153, which is disposed rotatably in the second casing 133 at a position opposed to the second shaft support portion 150b, is fitted in the crank shaft support portion 150b. An eccentric quantity between the crank shaft 121 and the eccentric shaft 121a and an eccentric quantity between the second crank shaft 153 and the eccentric shaft 153a are the same eccentric quantity $\epsilon$. The second crank shaft 153 is connected to the crank shaft 121 through, for example, a timing belt (not shown) and rotates in synchronism with the crank shaft 121.

Thus, the movable scroll 135 is supported stably at two points which are the eccentric shaft 121a of the crank shaft 121 and the eccentric shaft 153a of the second crank shaft 153. When the crank shaft 121 is rotated, the movable scroll portions 151 and 152 each perform a rotational motion with the eccentric quantity $\epsilon$ as a radius relative to the stationary scroll portions 140, 141 and 142, 143.

With this rotational motion, crescent spaces formed between the stationary scroll portions 140, 141, as well as 142, 143, and the movable scroll portions 151, 152 move successively toward the center while being narrowed, so that compressed air is discharged continuously from the discharge port 131. Sealing members 156 formed of a compressed air sealing resin or the like are provided on axial end faces of the stationary scroll portions 140, 141, 142, 143 and the movable scroll portions 151, 152.

In the crank shaft 30, as described above, the pair of crank webs 30w are rotatably supported on both sides thereof by a pair of bearings 39. In addition, drive system components such as the starting clutch 56 and the shift clutch 91 are disposed on the outer side (front side) of one bearing 39, while auxiliary devices of the engine such as the starting driven gear 77, generator 101 and scroll type supercharger 120 are disposed on the outer side (rear side) of the other bearing 39. Thus, the drive system and the auxiliary device system are spaced apart from each other, whereby a starting shock which occurs upon engagement of the starting clutch at the time of starting of the vehicle and a shift shock which occurs upon engagement of the shift clutch 91 at the time of shifting can be made difficult to be transmitted to auxiliary devices, e.g., the scroll type supercharger 120.

According to the vehicle 1 having an internal combustion engine with a supercharger of this embodiment, the scroll type supercharger 120 is disposed on one side-face side (rear face side) of the engine E on which the intake port 60 is disposed, and the crank shaft 121 of the scroll type supercharger 120 is fixed to the crank shaft 30 extending to the rear from the engine E. Therefore, such a transfer part as a belt is not necessary. Thus, it becomes possible to attain a reduction in the size of the engine E. Moreover, since the air cleaner 22 is disposed above the scroll type supercharger 120 and behind the engine E, it is possible to effectively utilize the space present behind the engine E and narrow the size of the engine in the vehicular transverse direction.

Although the engine described in the above embodiment is a four-stroke engine mounted on an all-terrain vehicle, no limitation is made thereto. Any type of engine will do and will bring about the same effects as described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A vehicle having an internal combustion engine with a supercharger, said vehicle comprising:
   an intake port disposed on one side-face side of a cylinder head of said engine and into which a fuel mixture is supplied;
   a crank shaft supported rotatably within a crank case of said engine; and
   said supercharger adapted to pressurize air to be supplied to said engine and supply the pressurized air to said intake port, wherein
   said crank shaft extends from said crank case in a direction substantially orthogonal to said one side-face, and
   said supercharger is disposed on said one side-face side with said intake port disposed thereon and is fixed to said crank shaft extending from said crank case.
2. The vehicle having an internal combustion engine with a supercharger according to claim 1,
   which is a saddle-ride type vehicle; and
   wherein said crank shaft extends in a longitudinal direction of said saddle-ride type vehicle.

3. The vehicle having an internal combustion engine with a supercharger according to claim 1, wherein said intake port has an opening which opens to a rear surface of said cylinder head, and there is further provided an air cleaner positioned above and upstream of said supercharger and behind said engine to supply air introduced from the exterior to said supercharger.

4. The vehicle having an internal combustion engine with a supercharger according to claim 2, wherein said intake port has an opening which opens to a rear surface of said cylinder head, and there is further provided an air cleaner positioned above and upstream of said supercharger and behind said engine to supply air introduced from the exterior to said supercharger.

5. The vehicle having an internal combustion engine with a supercharger according to claim 1, and further including an intake pipe operatively connected to an opening of the intake port with a fuel injection device in communication with said intake port for supplying fuel thereto.

6. The vehicle having an internal combustion engine with a supercharger according to claim 1, and further including a flywheel operatively mounted to a forward end of the crank shaft with a plurality of protuberances formed on an outer periphery surface of the flywheel in a predetermined angle range and at predetermined intervals in a circumferential direction and further including a pulse sensor for detecting the protuberances and for generating a detection signal.

7. The vehicle having an internal combustion engine with a supercharger according to claim 1, wherein the supercharger includes a first casing formed with the intake port, a second casing and a third casing, the second and third casings being formed in a bottomed cylindrical shape and functioning with stationary scrolls and with a movable scroll formed within.

8. The vehicle having an internal combustion engine with a supercharger according to claim 7, wherein the first, second and third casings are assembled with bolts wherein the movable scroll is mounted between the second and third casings with the supercharger being fixed with a plurality of bolts to a rear of the engine.

9. The vehicle having an internal combustion engine with a supercharger according to claim 7, wherein the second and third casings function as stationary scrolls with thin plate-like stationary scrolls formed to extend in a longitudinal direction of the vehicle and being disposed to be equal in phase and in opposition to each other.

10. The vehicle having an internal combustion engine with a supercharger according to claim 9, wherein the movable scroll includes thin plate-like movable scroll portions formed by a pair of involute curves with a central point as an origin and extend in a longitudinal direction of the vehicle.

11. A supercharger for use with an engine comprising:
a cylinder head;
an intake port disposed on one side-face side of the cylinder head for receiving a fuel mixture;
a crank case for the engine; and
a crank shaft supported rotatably within the crank case;
wherein the supercharger is adapted to pressurize air to be supplied to the engine and supply the pressurized air to said intake port and the crank shaft extends from the crank case in a direction substantially orthogonal to said one side-face, and said supercharger is disposed on said one side-face side with said intake port disposed thereon and is fixed to said crank shaft extending from said crank case.

12. The supercharger according to claim 11, wherein said intake port has an opening which opens to a rear surface of said cylinder head, and there is further provided an air cleaner positioned above and upstream of said supercharger and behind said engine to supply air introduced from the exterior to said supercharger.

13. The supercharger according to claim 11, and further including an intake pipe operatively connected to an opening of the intake port with a fuel injection device in communication with said intake port for supplying fuel thereto.

14. The supercharger according to claim 11, and further including a flywheel operatively mounted to a forward end of the crank shaft with a plurality of protuberances formed on an outer periphery surface of the flywheel in a predetermined angle range and at predetermined intervals in a circumferential direction and further including a pulse sensor for detecting the protuberances and for generating a detection signal.

15. The supercharger according to claim 11, wherein the supercharger includes a first casing formed with the intake port, a second casing and a third casing, the second and third casings being formed in a bottomed cylindrical shape and functioning with stationary scrolls and with a movable scroll formed within.

16. The supercharger according to claim 15, wherein the first, second and third casings are assembled with bolts wherein the movable scroll is mounted between the second and third casings with the supercharger being fixed with a plurality of bolts to a rear of the engine.

17. The supercharger according to claim 15, wherein the second and third casings function as stationary scrolls with thin plate-like stationary scrolls formed to extend in a longitudinal direction of the vehicle and being disposed to be equal in phase and in opposition to each other.

18. The supercharger according to claim 17, wherein the movable scroll includes thin plate-like movable scroll portions formed by a pair of involute curves with a central point as an origin and extend in a longitudinal direction of the vehicle.

19. The supercharger according to claim 18, wherein a starting point of the movable scroll portions are set at 90 degrees clockwise of semiclockwise from rotated positions of starting points of the stationary scroll portions.

20. The supercharger according to claim 11, wherein an eccentric shaft includes an eccentric quantity relative to the axis of the crank shaft being fitted in a central aperture of a boss formed on a movable base plate with a second crank shaft support portion and an eccentric shaft of a second crank shaft being rotatably disposed in a second casing at a position opposed to the second shaft support portion fitted in the crank shaft support portion.

* * * * *